E. J. MARCHAND.
FLY EXTERMINATOR.
APPLICATION FILED AUG. 27, 1921.

1,422,287.

Patented July 11, 1922.

Inventor
Edward J. Marchand
Geo. Stevens
Attorney

UNITED STATES PATENT OFFICE.

EDWARD J. MARCHAND, OF DULUTH, MINNESOTA.

FLY EXTERMINATOR.

1,422,287.  Specification of Letters Patent.  Patented July 11, 1922.

Application filed August 27, 1921. Serial No. 495,996.

*To all whom it may concern:*

Be it known that I, EDWARD J. MARCHAND, a citizen of the United States, residing at Duluth, in the county of St. Louis and State of Minnesota, have invented certain new and useful Improvements in Fly Exterminators, of which the following is a specification, reference being had therein to the accompanying drawing.

This invention relates to fly exterminating devices and has particular reference to one wherein a fly coming in contact therewith will be killed, or electrocuted.

The principal object of the invention is to produce a sanitary device of this character which will kill a fly upon its coming into contact therewith, and one wherein the killed flies may be easily and quickly removed.

Other objects and advantages of the invention will appear in the further description thereof.

Referring to the accompanying drawing forming part of this application in which like reference characters indicate like parts:

Figure 1:
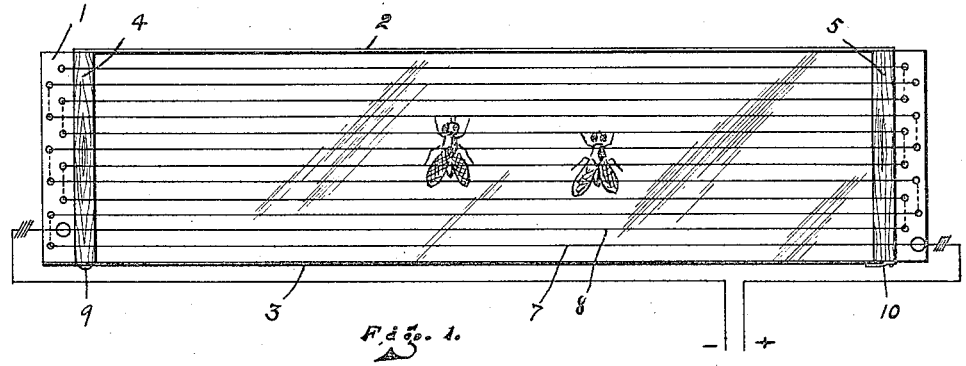
Figure 1 is a plan view of one embodiment of the invention.
Figure 2:
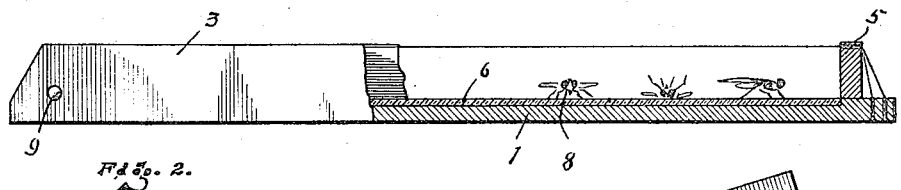
Figure 2 is a side elevation of the same, partly in section.
Figure 3:
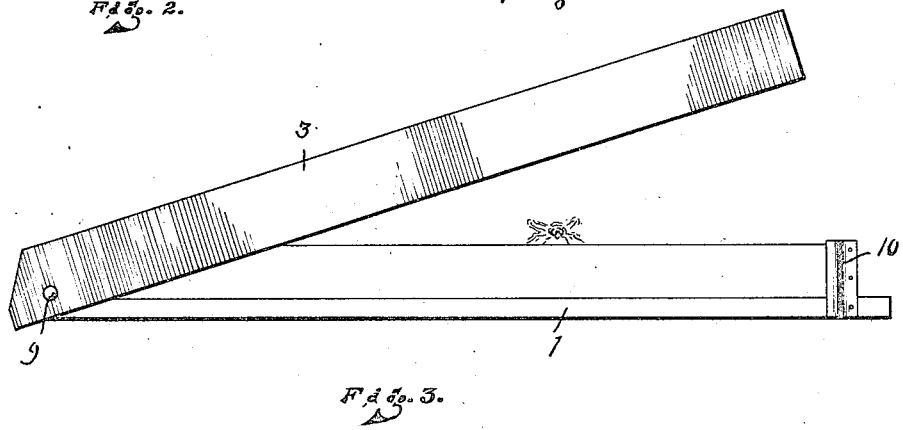
Figure 3 is a side elevation, illustrating the manner in which the killed flies may be removed from the trap.

The device consists of an open, rectangularly shaped, shallow receptacle, comprising the base 1, the sides 2 and 3, and the ends 4 and 5.

It is well known to those familiar with the characteristics of flies that they are loath to enter any kind of a darkened receptacle, or one from which light is excluded, and therefore I have installed in any desired manner in the upper face of the base 1 between the ends 4 and 5, a mirror 6, it forming the bottom of the receptacle, and the purpose of which is to reflect the light, or make the interior of the receptacle appear light for attracting the flies. It may also be found advantageous in that a fly will always see his reflection in the mirror and thereby appear doubly numerous, thus improving the luring properties of the device, as it is well known that numbers are attractive to them.

I have shown a plurality of uninsulated copper wires 7 and 8 spanning the open top of the receptacle intermediate of the two ends thereof, they being positioned closely together and so arranged that the positively and negatively charged wires will occur alternately; thus should a fly attempt to enter the receptacle, it would come in contact with at least two of the bare wires, closing the circuit and thereby become electrocuted.

In practice it has been found, that since flies flock together the greatest difficulty is to catch or kill the first fly so that its presence will lure others, and therefore, it may be advantageous to paint a few flies on the face of the mirror, or even better place a few decoy flies in the receptacle as an attraction, one of which is illustrated at 8.

As a means for emptying the trap when necessary, I have shown the side 3 as pivoted to the end 4 in any desired manner as at 9, the free end of which is engaged when closed behind the clip 10 at the corner of the receptacle.

The arrangement of wiring of the device is such that the circuit is always open and may be connected by an ordinary plug to any house lighting circuit sufficiently strong for the purpose intended.

Having thus described my invention, what I claim and desire to secure by Letters Patent, is:

A device of the character described comprising a shallow elongated open receptacle, means for attracting flies in the bottom of the receptacle, spaced non-insulated electric wires transverse the opening, an open electric circuit associated with the wires, side walls upon the longer sides of the receptacle, one of said side walls being pivotally attached at one end whereby to conveniently remove the dead flies when collected within the receptacle.

In testimony whereof I hereunto affix my signature in the presence of two witnesses.

EDWARD J. MARCHAND.

Witnesses:
S. C. BRONSON,
S. GEO. STEVENS.